(12) United States Patent
Skerka et al.

(10) Patent No.: US 6,615,501 B2
(45) Date of Patent: Sep. 9, 2003

(54) ANGLE DETECTION DEVICE WITH A DATA TRANSMISSION PATH ON AN N·360° BEARING ASSEMBLY OF A GYRO COMPASS

(75) Inventors: Wolfgang Skerka, Rendsburg (DE); Ulf Bey, Grossharrie (DE); Werner Bast, Kiel (DE)

(73) Assignee: Raytheon Marine GmbH (DE)

( * ) Notice: Subject to any disclaimer, the term of this patent is extended or adjusted under 35 U.S.C. 154(b) by 0 days.

(21) Appl. No.: 10/047,635

(22) Filed: Jan. 15, 2002

(65) Prior Publication Data

US 2002/0092187 A1 Jul. 18, 2002

(30) Foreign Application Priority Data

Jan. 18, 2001 (DE) .......................................... 101 02 278

(51) Int. Cl.[7] ................................................ G01C 19/38
(52) U.S. Cl. .......................................... 33/324; 33/1 PT
(58) Field of Search ................................ 33/1 PT, 316, 33/355 R, 600, 318, 319, 320, 324

(56) References Cited

U.S. PATENT DOCUMENTS

| 4,117,602 A | * | 10/1978 | Lapeyre ........................ 33/313 |
| 4,414,754 A | * | 11/1983 | Lapeyre ........................ 33/355 R |
| 4,449,191 A | * | 5/1984 | Mehnert ........................ 33/1 PT |
| 4,466,189 A | * | 8/1984 | Tobin, Jr. ........................ 33/1 PT |
| 4,660,036 A | * | 4/1987 | Mosier ........................ 33/1 PT |
| 4,719,449 A | * | 1/1988 | Cousseau ........................ 33/1 PT |
| 5,129,725 A | * | 7/1992 | Ishizuka et al. ............... 33/707 |
| 5,152,066 A | * | 10/1992 | Rieder et al. ............... 33/1 PT |
| 5,301,434 A | * | 4/1994 | Imaizumi ........................ 33/1 PT |
| 5,448,835 A | * | 9/1995 | Lewis ........................ 33/355 R |
| 5,657,544 A | * | 8/1997 | Ota et al. ........................ 33/1 PT |
| 6,470,577 B1 | * | 10/2002 | Tondorf et al. ............... 33/1 PT |

* cited by examiner

*Primary Examiner*—G. Bradley Bennett
(74) *Attorney, Agent, or Firm*—Shlesinger, Fitzsimmons & Shlesinger

(57) ABSTRACT

An angle detection device with a data transmission path on an n·360° bearing assembly with at least one scanning disk (21) arranged on one of two components at right angles to the axis of rotation, and with electro-optical illumination and detection means on the respective components held together by the bearing assembly, for scanning the instantaneous angle of the scanning disk (21), wherein electro-optical data transmission means are provided on said scanning disk (21) and on a surface opposite said scanning disk (21).

3 Claims, 1 Drawing Sheet

ANGLE DETECTION DEVICE WITH A DATA TRANSMISSION PATH ON AN N·360° BEARING ASSEMBLY OF A GYRO COMPASS

FIELD OF THE INVENTION

This invention refers to an angle detection device with a data transmission path of an n·360° bearing assembly of a gyro compass, and to a gyro compass having this type of angle detection device and data transmission path.

BACKGROUND OF THE INVENTION

The problems and demands arising for these bearing assemblies are described below first of all for the concrete example of use in a gyro compass.

Gyro compasses, such as those known in DE-A1 44 26 293, comprise a compass system disposed in a casing and constantly maintaining its orientation relative to the earth's surface while in sustained rapid rotation. The casing here is attached to a support frame that can be adjusted by a tracking motor so as to match the instantaneous compass system orientation, i.e., in instantaneous angle to the casing to reduce the angle occurring between the compass system and the casing back to zero.

The absolute value of this adjustment of the casing is preferably detected as an absolute angle by electro-optical scanning of a coded marking on a scanning disk. This give the relative change in course of a vehicle such as a ship while the vehicle body turns together with the support frame connected to it, relative to the compass system with its constant orientation. The results of the electro-optical scanning are preferably fed to additional electronic processing means and finally to a display. The detection of this angle is explained in greater detail in the given publication.

The float with a compass system in a gyro compass of this kind is kept in an electrolytic fluid that is warmed up relative to the ambient temperature and is thus more viscous. The fluid is also put in motion by pumps. Up to now, the operating state of these pumps, the temperature of the fluid, and the control signals for the compass system setting and for the heating have been transmitted electrically through slipring connections. The problem with this is that especially when digital signals are used—which is common practice nowadays—but also in the case of analog signals, individual bits can "get lost" through the slipring connection, which results in totally false data transmission. Therefore, up to now the transmitted data has been examined for plausibility by complex computer programs before being fed to the tracking motor. In spite of this considerable effort, problems with false status data can still arise.

OBJECTS AND SUMMARY OF THE INVENTION

Therefore, it is an object of the invention to create a construction in which these problems do no occur and in which the response time for the adjustment can be abbreviated.

This problem is solved in accordance with the invention by a gyro compass having the features disclosed herein.

A particular advantage herein is that additional electro-optical data transmission means for the angle data are provided on the scanning disk. Together with corresponding data transmission means provided on an opposite surface, these additional means form a data transmission path-a bi-directional path in a preferred embodiment—which enables the accurate electro-optical transmission of data even if the scanning disk is rotated relative to the opposite surface set on the support frame.

A current from the power supply can be introduced in a conventional manner, for instance through a slipring connection. The properties of the slipring connection pose no problems here.

One emitter and one receive diode each (or a transistor) are advantageously provided in close proximity to the center of rotation of the scanning disk. Preferably even two each of the same type of components are provided directly on the axis of rotation. In this way the optical transmission path—which now always extends at the same angle from the rotational axis—also always uses the same illumination angle of the diodes, independently of the rotational angle of the scanning disk. This ensures that no intensity fluctuations caused by varying illumination angles can occur if the scanning disk is rotated.

Aside from its use in gyro compasses, the angle detection device with a data transmission path on an n·360° bearing assembly is suitable for any arrangements of two components together and, if applicable, also for those on which several (partial) scanning surfaces are covered by corresponding electro-optical scanning means.

The electronics for data conversion provided on the fixed component—in the example of the compass, the one on the opposite side connected to the support frame—can then be laid out in a suitable manner, as can the electronics provided on the movable component, for instance to pass data on to a CAN bus system (controller area network).

BRIEF DESCRIPTION OF THE DRAWING

Additional features and advantages of the invention re revealed in the following description of the preferred embodiment of the invention.

DETAILED DESCRIPTION OF THE INVENTION

Figure 1:
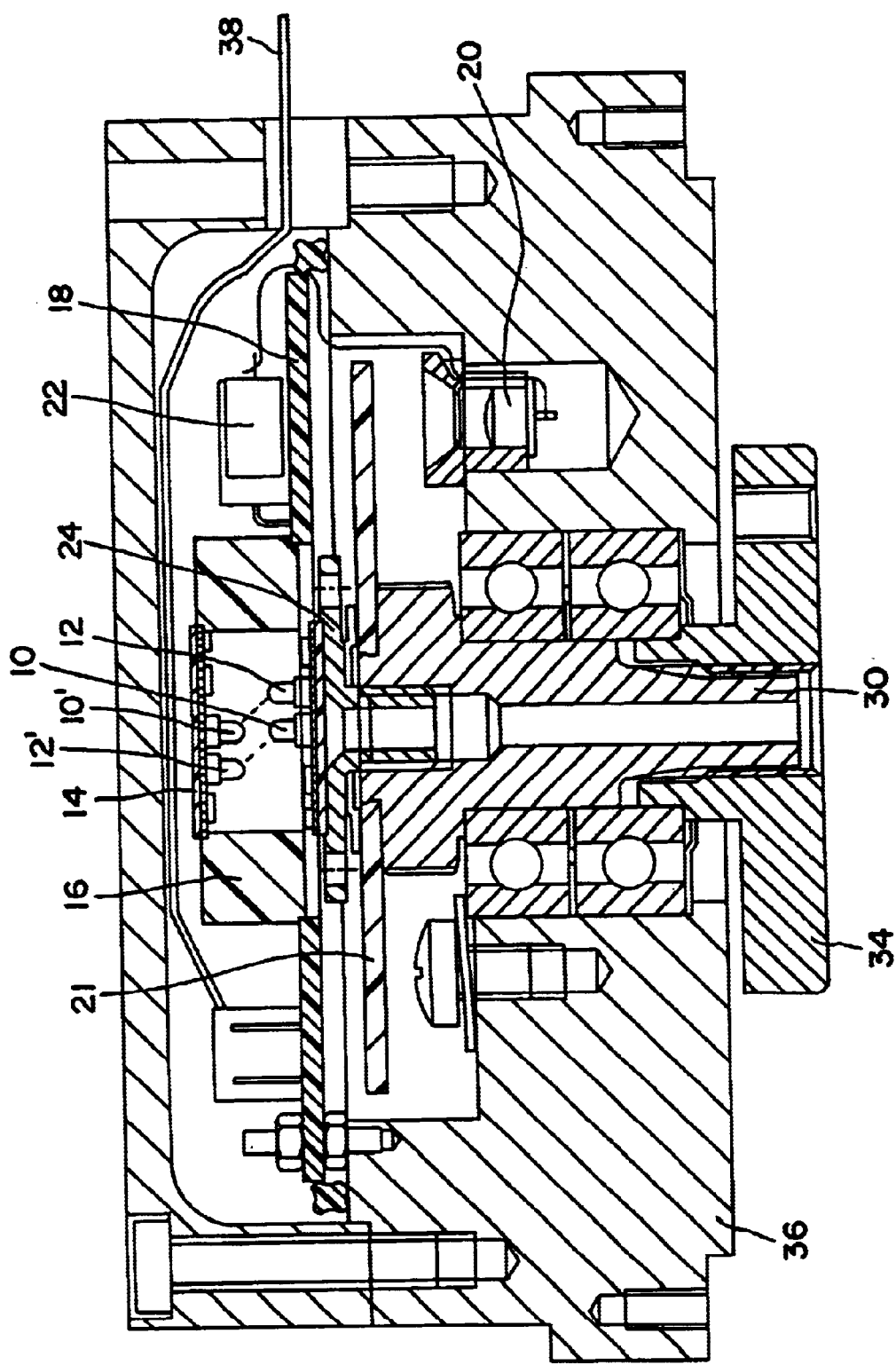
FIG. 1 shows a section through the bearing assembly in the area of the scanning disk.

The axis of rotation 30 shown with a hollow core of a gyro compass casing supports the angle detection device with a data transmission path according to the invention and can be rotated by n·360°. The actual compass system is located in the casing (not shown) suspended below the bearing assembly on the component with reference number 34. The casing, following the orientation of the compass system, is adjusted through rotation by a drive means of the n·360° bearing assembly. The housing 36 to which the drive is attached is stationary—i.e., it is coupled to a vehicle body.

The casing is adjusted by means of a gyro scanning system that reads out the position of the float with the rapidly rotating gyroscope via contacts on the casing through a bridge circuit. The gyro scanning system converts this data in a follow-up, circuit to generate follow-up signals for the drive, which correspond to a relative angle between the gyroscope and the casing that occurs when the vehicle turns.

Now since the round scanning disk 21, which extends at right angles from the axis of rotation, is fixed to the casing, an angle will occur between the disk and the opposite surface fixed to the vehicle body. The absolute value of the angle can be read out from the data received by a number of electro-optical detection means 22 arranged on a board 18 and illuminated through the round coded scanning disk 21 by a light-emitting diode 20. Except for the code applied to it the scanning disk is essentially transparent.

Thus, since a board 24 is already present on a surface parallel to the scanning surface 18 a data connection such as one with 400 kBaud can be produced without notable apparative production effort by providing an optical bi-directional connection using an Opto Array (if applicable with analog ASIC) and—for example-two GaAlAs diodes with phototransistors as sensors.

This optical transmission path can be operated in a broad operating temperature range (−20° C. to 85° C.) and is insensitive to vibration (1–58 Hz. 1 mm tolerable and 58–1000 (according to DIN IEC 68): 1000 m/s$^2$).

Generally, this angle detection device with data transmission path can be used on any conceivable n·360° arrangement of two components together, such as on robot arms or on antennae.

A monodirectional data transmission between the scanning disk 21 and the opposite surface 14 is also conceivable here.

However, a bi-directional connection is preferred in which two components of the same kind-two emitters 10. 10' or two receivers 12, 12'-are each arranged in the axis of rotation, while the complementary component is arranged in close proximity on the scanning disk 21 or the opposite surface 14. This results in a transmission path that always occurs at a constant transmission angle and, moreover, always has the same length. The particular advantage of this is that the illumination angles occurring do not vary.

Thus, as FIG. 1 suggests with two dotted lines, when two components 10, 12 or 10', 12' respectively together forming a transmission path are rotatable relative to one another, they always lie within an area of an LED transmission cone with the same emission intensity but they also lie within a receiving angle of the complementary transistor or of a corresponding diode, that is always equally sensitive.

Since the series of sensor elements 22 reading out the code on the scanning disk 21 is in close proximity to the disk, and the diodes 10, 12 arranged on the scanning disk 21 have a certain height, as FIG. 1 clearly shows, a board 14 holding the opposite data transmission means 10', 12' is arranged on the opposite surface—a board 24—in a raised position in a small housing 16 shielded from stray light and electromagnetic interference.

Furthermore, the diodes 12, 12' are not provided directly on the scanning disk 21 (which is made of glass or plastic), but rather on an additional board 24 centrically attached to the axis of rotation 30, 34. The board 24 is connected through the hollow axis by cables to the other components located in the casing.

Finally, reference number 38 designates a flat cable that feeds the data to the outside from the fixed board 18 out of the gyro compass to the display and to other navigation devices.

What is claimed is:

1. Angle detection device on an n×360° bearing assembly of a gyro compass, comprising:
   a) a stationary housing;
   b) an n×360° bearing assembly of a gyro compass rotatably secured to said housing, said bearing assembly including a hollow core through its axis of rotation;
   c) a rotating disk secured to said bearing assembly at right angle to the axis of rotation;
   d) electro-optical illumination and detection means for scanning the instantaneous angle of said disk;
   e) a first board secured to said bearing assembly and rotatable with the axis of rotation, said first board being connected to the rest of the gyro compass through said hollow core;
   f) a second board fixed to said housing disposed opposite said first board;
   g) first semiconductor emitter disposed on said first board and first light detector disposed on said second board opposite said first semiconductor emitter, said first semiconductor emitter and said first light detector forming an optoelectronic information transmission path between said first and second boards; and
   h) second semiconductor emitter disposed on said second board and second light detector disposed on said first board opposite said second semiconductor emitter, said second semiconductor emitter and said second light detector forming another optoelectronic information transmission path between said first and second boards.

2. Angle detection device as in claim 1, wherein:
   a) said first and second semiconductor emitters are disposed along said axis of rotation; and
   b) said first and second light detectors are disposed adjacent the respective first and second semiconductor emitters, such that said first light detector is opposite said first semiconductor emitter rotating around its own axis, and such that said second semiconductor emitter is opposite said second light detector rotating around said axis of rotation of said bearing assembly.

3. A gyro compass, comprising:
   a) a stationary housing secured to a vehicle body;
   b) an n×360° bearing assembly rotatably secured to said housing, said bearing assembly including a hollow core through its axis of rotation;
   c) a compass having a constantly maintained orientation relative to the earth's surface while in sustained rapid rotation;
   d) a casing surrounding said compass, said casing being freely rotatable on said n×360° bearing assembly;
   e) a scanning device for generating signals corresponding to a relative angle between said compass and said casing when the vehicle turns;
   f) said scanning device comprising a scanning disk set on said casing, said scanning disk being mounted on an axis of rotation of said bearing assembly;
   g) a surface attached to said housing, said surface being opposite said disk;
   h) first semiconductor emitter disposed on said first disk and first light detector disposed on said surface opposite said first semiconductor emitter, said first semiconductor emitter and said first light detector forming an optoelectronic information transmission path between said disk and said surface; and
   i) second semiconductor emitter disposed on said surface and second light detector disposed on said disk opposite said second semiconductor emitter, said second semiconductor emitter and said second light detector forming another optoelectronic information transmission path between said disk and surface.

* * * * *